US007049605B2

(12) United States Patent
Suzuki et al.

(10) Patent No.: US 7,049,605 B2
(45) Date of Patent: May 23, 2006

(54) DETECTOR USING MICROCHANNEL PLATES AND MASS SPECTROMETER

(75) Inventors: Takayuki Suzuki, Tokyo (JP); Nobuo Kudou, Tokyo (JP); Jun Tamura, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 11/043,690

(22) Filed: Jan. 26, 2005

(65) Prior Publication Data

US 2005/0184249 A1 Aug. 25, 2005

(30) Foreign Application Priority Data

Jan. 30, 2004 (JP) ................................ 2004-23683

(51) Int. Cl.
*G01K 1/08* (2006.01)
*H01J 3/14* (2006.01)

(52) U.S. Cl. ...................... 250/397; 250/305; 250/310; 313/103 CM; 313/105 CM

(58) Field of Classification Search ................. 250/397
See application file for complete search history.

(56) References Cited

U.S. PATENT DOCUMENTS 4,868,394 A * 9/1989 Fukuhara et al. ........... 250/397

FOREIGN PATENT DOCUMENTS

JP 2001-273867 10/2001

* cited by examiner

*Primary Examiner*—John R. Lee
*Assistant Examiner*—Jennifer Yantomo
(74) *Attorney, Agent, or Firm*—The Webb Law Firm

(57) ABSTRACT

A mass spectrometer detector having a coupling capacitor including an anode that is placed at a high potential of say −4.9 kV. An annular electrode is placed outside the anode. A voltage of say −5 kV is applied to the annular electrode. This reduces the potential difference between the anode and the annular electrode, mitigating the electric field. A peripheral electrode is mounted on the outer fringe of a dielectric body and stably held at a potential of say −2.5 kV, for example, by voltage-dividing resistors.

8 Claims, 3 Drawing Sheets

DETECTOR USING MICROCHANNEL PLATES AND MASS SPECTROMETER

BACKGROUND OF THE INVENTION

1. Field of the Invention

The present invention relates to a particle detector using microchannel plates for detecting charged particles, such as ions and electrons, and also to a mass spectrometer.

2. Description of Related Art

Microchannel plates (MCPs) are used to detect very weak ions and electrons and are important as a detector for mass spectrometry. A microchannel plate is fabricated by forming a multiplicity of holes in a glass plate and making a conductive coating on each surface of the plate. Furthermore, an appropriate substance having a high resistance value is applied on the inner surface of each formed hole.

As a result, if a voltage of about 2 kV is applied between the conductive coatings on both sides of the glass plate, a potential gradient is developed between the opposite ends of each hole. A material having high secondary electron emmissivity is selected as the applied resistive substance, and the internal surface of the hole functions as a dynode.

In this configuration, an accelerating voltage is applied to the surface hit by ions and electrons such that the ions and electrons may enter the inside of each of the multiplicity of holes efficiently. The ions and electrons accelerated and passed into the holes collide against the internal resistive substance, producing secondary electrons. The produced secondary electrons are accelerated and undergo multiple collisions with the resistive substance inside the holes having the potential gradient. As a result, the electrons are multiplied inside the holes and made to leave for the anode from the exit of each hole.

One prior art technique of this kind of apparatus has an anode electrode disposed on the output side of a microchannel plate (MCP). A dielectric body is sandwiched between the anode electrode and a grounding electrode. A signal produced in response to charged particles captured by the anode electrode is conveyed by a coaxial cable. The impedance matching between the anode electrode and the coaxial cable is made by appropriately selecting the thickness of the dielectric body, the relative dielectric constant, or both (see, for example, Japanese Patent Laid-Open No. 2001-273867).

FIG. 1 shows one example of ion detector utilizing the technique disclosed in Japanese Patent Laid-Open No. 2001-273867. The detector has two microchannel plates (MCPs) 1*a* and 1*b* which are stacked on top of each other in use. A high voltage (e.g., −4 kV) is applied from an ion acceleration high-voltage source 2 to the ion incident surface of the MCP 1*a*.

Furthermore, a high voltage (e.g., about 2 kV) is applied between the ion incident surface of the MCP assembly consisting of the two superimposed MCPs 1*a* and 1*b* and the exit surface from which multiplied electrodes exit from an MCP high-voltage source 3 via voltage-dividing resistors R1 and R2. The voltage source 3 produces a high voltage (e.g., 2.1 kV). As a result, the secondary electron emissive surface of the MCP 1*b* is at a potential of −2 kV. In addition, a potential of 0.1 kV is given to an anode 4 via a resistor R3. Consequently, the anode 4 is at a potential of −1.9 kV.

The electron emissive surface of the MCP 1*b* is grounded via a capacitor C2 to prevent the potential of the electron emissive surface from varying at the instant when a burst of electrons is emitted from the electron emissive surface of the MCP 1*b*. In consequence, the time response characteristics of the detector are improved. Hence, distortion in the signal is suppressed to a minimum.

The values of these potentials give examples on the assumption that the detector is used in a mass spectrometer that analyzes the mass-to-charge ratios of positive ions.

The signal responsive to the amount of electrons hitting the anode 4 is passed through a capacitor C1 to cut off the DC component, the capacitor C1 being made up of the anode 4, a dielectric body 5, and an electrode 6. The output signal from the capacitor C1 is supplied to an amplifier 7 operating at ground potential and is amplified.

In this configuration, positively charged ions are accelerated by the negative high voltage applied to the ion incident surface of the MCP 1*a* and pass into the MCP assembly. The incident ions collide against the inner surface of each hole inside the MCP assembly, producing secondary electrons. The produced secondary electrons further undergo multiple collisions with the inner surfaces of the holes, because a potential gradient is developed inside each hole. As a result, secondary electrons are produced in an avalanche.

In this way, secondary electrons multiplied in proportion to the number of incident ions inside the holes are obtained from the emissive surface of the MCP 1*b*. The secondary electrons are then accelerated toward the anode 4 that is at a higher potential than the emissive surface of the MCP 1*b*. The accelerated electrons collide against the anode 4. A signal responsive to the amount of electrons hitting the anode 4 is passed through the capacitor C1 to cut off the DC component, the capacitor C1 being made up of anode 4, dielectric body 5, and electrode 6. The output signal from the capacitor C1 is supplied to the amplifier 7 operating at ground potential, and is amplified.

Under the present circumstances, the anode of the above-described MCP detector can withstand voltages only up to 3 to 4 kV. Furthermore, the diameter of the MCP available today is less than 20 mm. Hence, there is a demand for an MCP detector using larger MCPs, operating at higher speeds, and withstanding higher voltages. Where a capacitor withstanding high voltages is used in a vacuum, if the capacitor is operated at a voltage exceeding 3 kV, field emission occurs from microscopically protruding portions on the surfaces of the electrodes and dielectric body forming the capacitor by the effect of the surrounding triple junction including the capacitor. That is, discharging takes place, making the detector impracticable.

In addition, where an organic polymer of high voltage resistance is used as a capacitor, it can be operated without depending on the size of the MCP or without worrying about the voltage resistance. However, the voltage on the outer fringe of the organic polymer adhesively bonded to the anode becomes unstable. Field emission occurs on the outer fringe of the polymer, resulting in discharging.

A great feature of the detector using MCPs is high speediness of the response signal. To obtain a high-speed signal having low noise, it is necessary to optimize the capacitance of the capacitor C1 of FIG. 1, the capacitance of the capacitor C2, and the inductance depending on the distance from the ground position to the electrode on the side of the MCP 1*b* through the capacitor C2. Especially, the structure of the detector must be so designed that the route from point A to point B (see FIG. 1) that is the return route for the signal is made shortest. Moreover, the capacitor C2 is required to have the same voltage-withstanding characteristics as the capacitor C1.

SUMMARY OF THE INVENTION

Accordingly, it is an object of the present invention to provide a detector structure which suppresses discharging, can withstand operations under high-voltage conditions, and can produce a high-speed response signal.

In the present invention, secondary electrons from an MCP are made to hit an anode that forms a part of a coupling capacitor. Annular electrodes are mounted outside the anode of the coupling capacitor, forming a second capacitor. An additional electrode (hereinafter may be referred to as the peripheral electrode) is formed on the outer fringe of a dielectric body forming the capacitor. The potential at the anode and the potential at one electrode forming the second capacitor are made close to each other. This makes the potential gradient around the anode milder, thus preventing discharging around the anode. In addition, the potential at the peripheral electrode is stabilized, thus preventing field emission from the outer fringe of the dielectric body. Discharging from the outer fringe can be suppressed.

Other objects and features of the present invention will appear in the course of the description thereof, which follows.

DESCRIPTION OF THE PREFERRED EMBODIMENT

Figure 1:
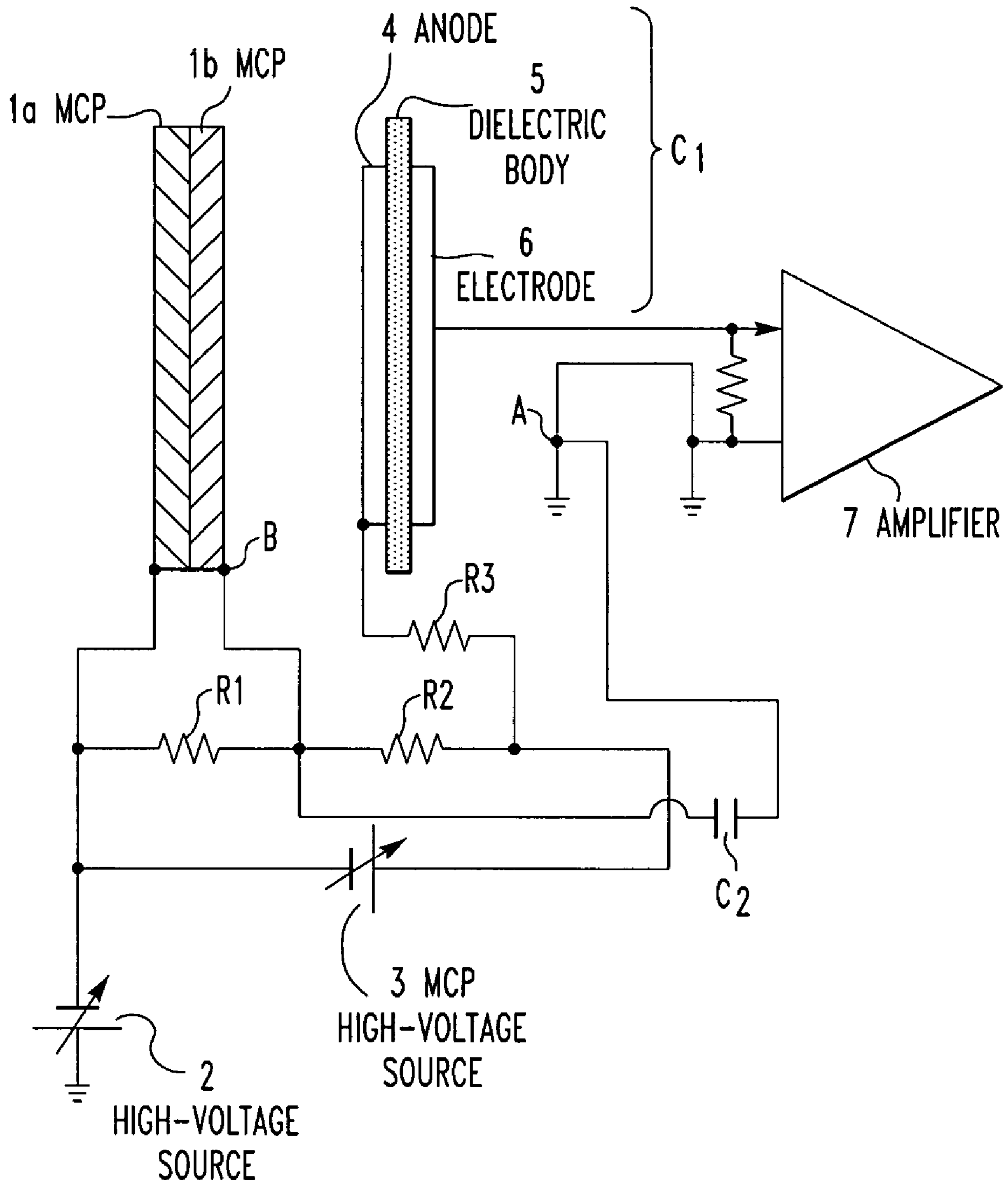
FIG.1 PRIOR ART
FIG. 1 is a schematic diagram of a detector using the prior art MCP assembly.
Figure 2:
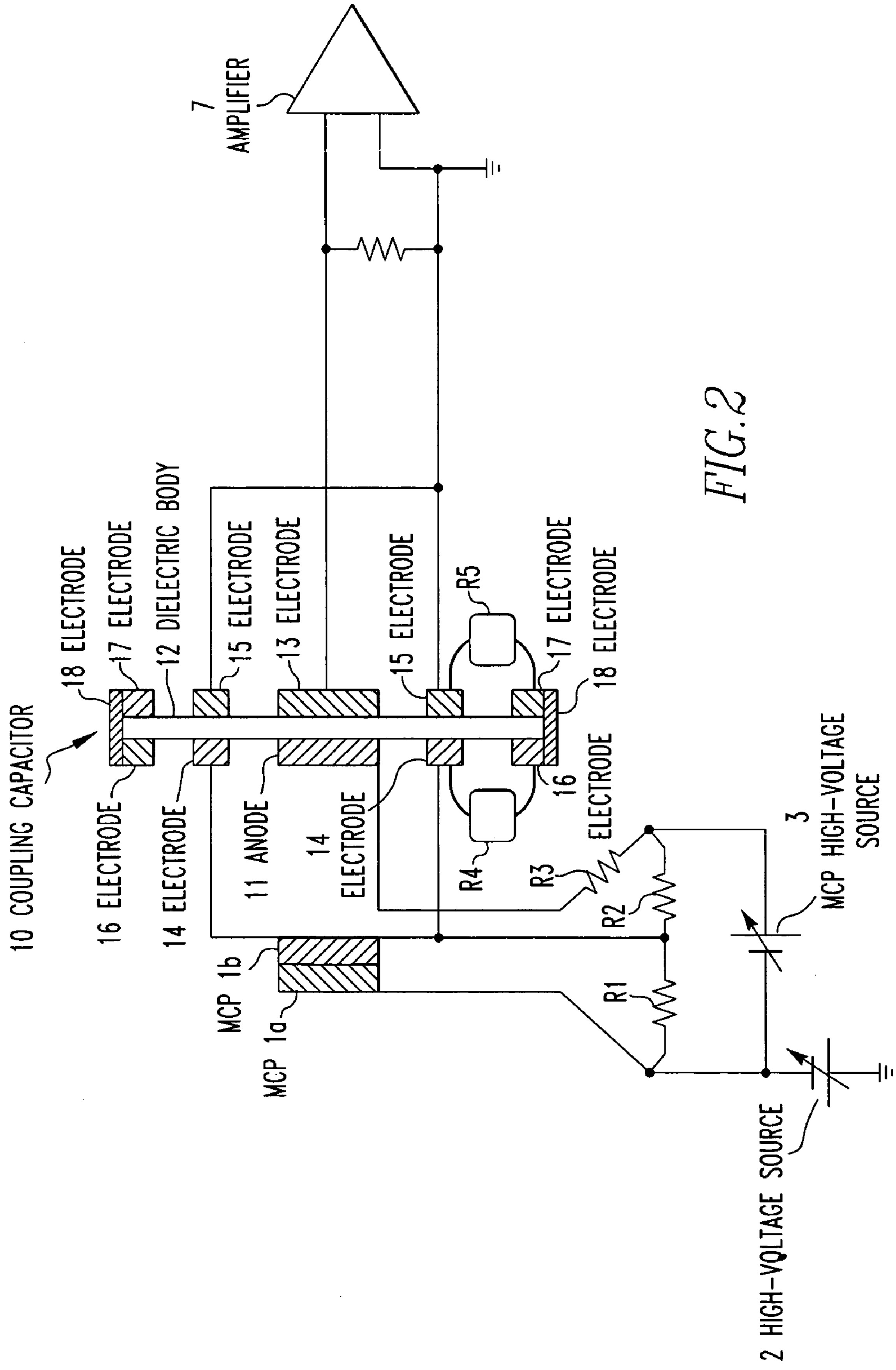
FIG. 2 is a schematic diagram of a detector using an MCP assembly according to the present invention.

An embodiment of the present invention is hereinafter described in detail with reference to the drawings. FIG. 2 shows the whole detector including a detector circuit according to the present invention. It is to be noted that like components are indicated by like reference numerals in both FIGS. 1 and 2. In FIG. 2, two microchannel plates (MCPs) 1*a* and 1*b* are stacked on top of each other in use. A high voltage of −7 kV, for example, is applied from an ion acceleration high-voltage source 2 to the ion incident surface of the MCP 1*a*.

Furthermore, a high voltage (e.g., about 2 kV) is applied between the ion incident surface of the MCP assembly consisting of the two superimposed MCPs 1*a* and 1*b* and the exit surface from which multiplied electrodes exit from an MCP high-voltage source 3 via a voltage-dividing resistor R1. The voltage source 3 produces a high voltage (e.g., 2.1 kV). As a result, the emissive surface of the MCP 1*b* is at a potential of −5 kV. In addition, a potential difference of 0.1 kV is secured between a disk-like anode 11 forming a part of a coupling capacitor 10 and the MCP 1*b* by a voltage-dividing resistor R2. The disk-like anode 11 is placed at a potential of −4.9 kV.

The values of these potentials give examples on the assumption that the detector is used in a mass spectrometer that analyzes the mass-to-charge ratios of positive ions.

Figure 3A:
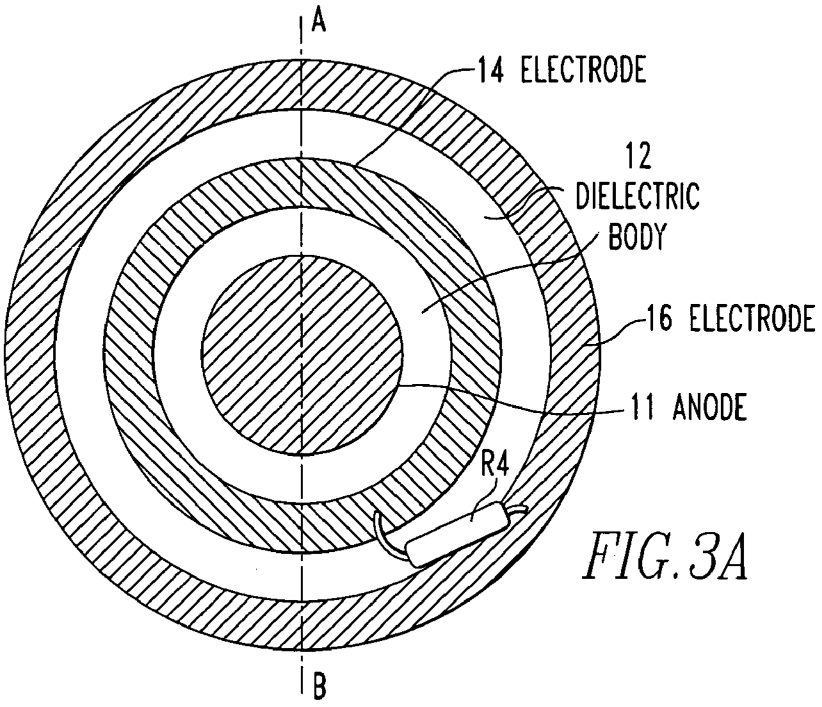
FIG. 3A is a front elevation of a coupling capacitor used in the detector shown in FIG. 2.
Figure 3B:
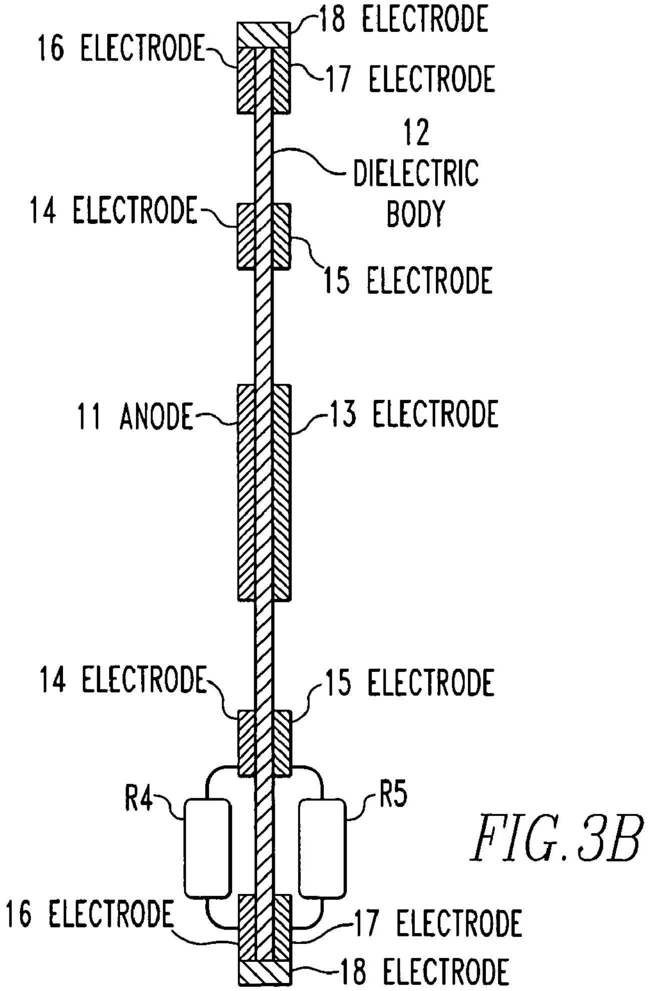
FIG. 3B is a cross-sectional view of the coupling capacitor shown in FIG. 3A.

The structure of the coupling capacitor 10 is described by referring to FIGS. 3A and 3B. FIG. 3A is a front elevation of the capacitor 10. FIG. 3B is a cross-sectional view taken along straight line A–B through the capacitor 10. An annular dielectric body 12 consists of an organic polymer. As shown in FIGS. 1A and 1B, the dielectric body may have two substantially parallel planar side surfaces. The disk-like anode 11 is stuck on one side surface of a central portion of the dielectric body 12. A disk-like electrode 13 is stuck at a position opposite to the disk-like anode 11 with the dielectric body 12 inserted therebetween. The contours of the disk-like anode 11 and electrode 13 are not always required to be genuinely circular. They may also be elliptical or polygonal.

Annular electrodes 14 and 15 are stuck to the opposite sides (side surfaces) of the dielectric body 12 coaxially with the disk-like anode 11 and electrode 13 and outside the disk-like anode 11 and electrode 13. In addition, annular electrodes 16 and 17 are formed on peripheral portions of the dielectric body 12 outside the electrodes 14 and 15. An annular peripheral electrode 18 is mounted on the outer fringe portion of the dielectric body 12 such that the outer fringe portion is covered. The peripheral electrode 18 is electrically connected with the annular electrodes 16 and 17. The annular electrodes 14 and 16 are connected via a voltage-dividing resistor R4. The annular electrodes 15 and 17 are connected via a voltage-dividing resistor R5. The contours of the electrodes 14–17 and of the peripheral electrode 18 are not always required to be genuinely circular. They may also be elliptical or polygonal.

In the coupling capacitor of this structure, the disk-like anode 11 is connected with the MCP high-voltage source 3 via a resistor R3. The annular electrode 14 is placed at the same potential as the secondary electron emissive surface of the MCP 1*b*. The electrode 15 is placed at ground potential. The electrode 13 is connected with an amplifier 7. The MCP assembly (1*a* and 1*b*) and coupling capacitor 10 are placed in a vacuum.

In this configuration, positively charged ions are accelerated by the high negative voltage applied to the ion incident surface of the MCP 1*a* and pass into the MCP assembly. The incident ions collide against the inner surface of each hole inside the MCP assembly, producing secondary electrons. The produced secondary electrons undergo multiple collisions with the inner surfaces of the holes, because a potential gradient is developed inside each hole. As a result, secondary electrons are produced in an avalanche.

In this way, secondary electrons multiplied in proportion to the number of incident ions inside the holes are obtained from the emissive surface of the MCP 1*b*. The secondary electrons are then accelerated toward the disk-like anode 11 that is at a higher potential than the emissive surface of the MCP 1*b*. The accelerated electrons collide against the disk-like anode 11. A signal responsive to the amount of electrons hitting the disk-like anode 11 is taken from the electrode 13 through the capacitor coupling. The signal is supplied to the amplifier 7 operating at ground potential, and is amplified.

The potential at the disk-like anode 11 of the coupling capacitor 10 is set to a high value of −4.9 kV. A voltage of −5 kV is applied to the annular electrode 14 located outside the disk-like anode 11. As a result, the potential difference between the disk-like anode 11 and electrode 14 is reduced, mitigating the electric field. Consequently, discharging around the disk-like anode 11 is prevented.

A peripheral electrode 18 is mounted on the outer fringe of the dielectric body 12. The peripheral electrode 18 is stably maintained at a potential of −2.5 kV, for example, by the voltage-dividing resistors R4 and R5. As a result, the potential on the outer fringe of the dielectric body 12 is prevented from becoming unstable; otherwise, field emission and thus discharging would take place. Consequently, the MCP assembly can be operated at higher voltages.

Referring also to FIG. 2, the electrodes 14 and 15 cooperate with the dielectric body 12 sandwiched therebetween to form the second capacitor. This can perform the same function as the capacitor C2 shown in FIG. 1. In this way, the capacitor C2 connecting the grounding electrode and MCP assembly is placed in immediate proximity to the disk-like anode 11 and fabricated integrally with the disk-like anode 11. Consequently, the components beginning with the grounding position and ending with the MCP electrodes can be connected with the shortest distance. At the same time, the potential difference with the peripheral electrode is reduced by the voltage-dividing resistors R4 and R5. Therefore, discharging from this portion is suppressed.

In addition, since the electron emissive surface of the MCP 1*b* is connected with the ground via the capacitor C2 (not shown) consisting of the electrodes 14 and 15 with the dielectric body 12 sandwiched therebetween, the potential at the electron emissive surface is prevented from varying at the instant when a burst of electrons is emitted from the electron emissive surface of the MCP 1*b*. As a result, the time response characteristics of the detector are improved. Distortion in the signal can be suppressed to a minimum.

While one embodiment of the present invention has been described so far, it is to be understood that the invention is not limited thereto. Rather, the embodiment can be modified variously. For example, the values of the potentials at various portions of the MCPs and coupling capacitor are merely exemplary. The invention is not limited to such potentials. Furthermore, in the above embodiment, the annular electrode 14 is connected with the secondary electron emissive surface of the MCP 1*b* and placed at the same potential as the emissive surface. A separate power supply may be used to set the potential at the annular electrode 14. In addition, in the above embodiment, positive ions are detected by a mass spectrometer. The invention can also be applied to detection of electrons, X-rays, and so on.

The present invention can be used in technical fields where very weak ions, electrons, and so on are detected. Especially, the present invention can be used as a detector for use in a mass spectrometer.

Having thus described our invention with the detail and particularity required by the Patent Laws, what is desired protected by Letters Patent is set forth in the following claims.

The invention claimed is:

1. A detector using microchannel plates, comprising:

a microchannel plate assembly having a secondary electron emissive surface and a particle incident surface;

a disk-like anode placed opposite to the secondary electron emissive surface of the microchannel plate assembly and placed at an electrical potential;

a dielectric body having a central portion to which the anode is mounted;

a disk-like electrode placed opposite to the anode such that the dielectric body is sandwiched between the disk-like electrode and the anode to form a capacitor;

first and second annular electrodes placed outside the anode and outside the disk-like electrode, said dielectric body being sandwiched between said first and second annular electrodes to form a second capacitor;

a power supply for applying a high voltage to the particle incident surface of the microchannel plate assembly; and a second power supply for developing a potential gradient between the particle incident surface and the secondary electron emissive surface of the microchannel plate assembly, wherein said first annular electrode is placed at an electrical potential sufficiently close to the electrical potential of the anode to prevent discharging around the anode.

2. A detector using microchannel plates according to claim 1, further comprising:

a peripheral electrode placed outside said first and second annular electrodes and disposed to cover an outer fringe portion of the dielectric body, said peripheral electrode being placed at an electrical potential;

a first voltage-dividing resistor placed between said first annular electrode and said peripheral electrode; and a second voltage-dividing resistor placed between said second annular electrode and said peripheral electrode, wherein the electrical potential of said peripheral electrode is stabilized by the voltage-dividing resistors.

3. A detector using microchannel plates as set forth in claim 2, wherein said first annular electrode and said secondary electron emissive surface of the channel plate assembly are at equipotential.

4. A detector using microchannel plates as set forth in claim 2, wherein said microchannel plate assembly and said capacitors each having the dielectric body inserted therein are placed in a vacuum.

5. A mass spectrometer equipped with a detector consisting of microchannel plates, said detector comprising:

a microchannel plate assembly having a secondary electron emissive surface and a particle incident surface;

a disk-like anode placed opposite to the secondary electron emissive surface of the microchannel plate assembly and placed at an electrical potential;

a dielectric body having a central portion to which the anode is mounted;

a disk-like electrode placed opposite to the anode such that the dielectric body is sandwiched between the disk-like electrode and the anode to form a capacitor;

first and second annular electrodes placed outside the anode and outside the disk-like electrode, said dielectric body being sandwiched between said first and second annular electrodes to form a second capacitor;

a first power supply for applying a high voltage to the particle incident surface of the microchannel plate assembly; and a second power supply for developing a potential gradient between the particle incident surface and the secondary electron emissive surface of the microchannel plate assembly, wherein said first annular electrode is placed at an electrical potential sufficiently close to the electrical potential of the anode to prevent discharging around the anode.

6. A mass spectrometer according to claim 5, further comprising:

a peripheral electrode placed outside said first and second annular electrodes and disposed to cover an outer fringe portion of the dielectric body, said peripheral electrode being placed at an electrical potential;

a first voltage-dividing resistor placed between said first annular electrode and said peripheral electrode; and a second voltage-dividing resistor placed between said second annular electrode and said peripheral electrode, wherein the electrical potential of said peripheral electrode is stabilized by the voltage-dividing resistors.

7. A mass spectrometer as set forth in claim 6, wherein said first annular electrode and said secondary electron emissive surface of the channel plate assembly are at equipotential.

8. A mass spectrometer as set forth in claim 6, wherein said microchannel plate assembly and said capacitors each having the dielectric body inserted therein are placed in a vacuum.

* * * * *